United States Patent
Barth et al.

(10) Patent No.: US 12,237,974 B2
(45) Date of Patent: *Feb. 25, 2025

(54) DYNAMIC CREATION OF OVERLAY NETWORK SLICES USING BORDER GATEWAY PROTOCOL FLOW SPECIFICATIONS

(71) Applicant: Juniper Networks, Inc., Sunnyvale, CA (US)

(72) Inventors: Jonathan C. Barth, Collegeville, PA (US); Vishnu Pavan Beeram, Hyderabad (IN); Srihari Ramachandra Sangli, Bengaluru (IN); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,310

(22) Filed: Apr. 1, 2024

(65) Prior Publication Data

US 2024/0243974 A1    Jul. 18, 2024

Related U.S. Application Data

(63) Continuation of application No. 18/149,338, filed on Jan. 3, 2023, now Pat. No. 11,949,560.

(51) Int. Cl.
*H04L 41/0893*  (2022.01)
*H04L 12/46*  (2006.01)
(Continued)

(52) U.S. Cl.
CPC ...... *H04L 41/0893* (2013.01); *H04L 12/4641* (2013.01); *H04L 41/40* (2022.05); *H04L 45/04* (2013.01); *H04L 45/64* (2013.01)

(58) Field of Classification Search
CPC . H04L 41/0893; H04L 12/4641; H04L 41/40; H04L 45/04; H04L 45/64; H04L 45/02
See application file for complete search history.

(56) References Cited

U.S. PATENT DOCUMENTS

| 11,949,560 B1 | 4/2024 | Barth et al. |
| 2009/0097490 A1 | 4/2009 | Sanderson et al. |

(Continued)

FOREIGN PATENT DOCUMENTS

| EP | 3422660 A1 | 1/2019 |
| WO | 2022068484 A1 | 4/2022 |

OTHER PUBLICATIONS

Extended European Search Report for Application No. EP23162115., mailed on Sep. 7, 2023, 8 pages.

*Primary Examiner* — SM A Rahman
(74) *Attorney, Agent, or Firm* — Harrity & Harrity, LLP (57) ABSTRACT

A network device may receive a border gateway protocol (BGP) flow specification route associated with creation of an overlay network slice in a network, and may create a new routing instance based on the BGP flow specification route. The network device may associate interfaces defined by the BGP flow specification route with virtual private network (VPN) members, and may determine VPN parameters based on the BGP flow specification route. The network device may advertise the VPN parameters within the network to cause the network to generate the overlay network slice.

20 Claims, 8 Drawing Sheets

(51) Int. Cl.
  *H04L 41/40*  (2022.01)
  *H04L 45/02*  (2022.01)
  *H04L 45/64*  (2022.01)

(56) References Cited

U.S. PATENT DOCUMENTS

| | | |
|---|---|---|
| 2013/0117449 A1 | 5/2013 | Hares et al. |
| 2019/0238457 A1 | 8/2019 | T |
| 2020/0007584 A1* | 1/2020 | Dixit ................ H04L 43/08 |
| 2021/0258251 A1 | 8/2021 | Eastlake, III |
| 2021/0282072 A1 | 9/2021 | Xin et al. |
| 2022/0014394 A1 | 1/2022 | Zhao et al. |
| 2023/0164113 A1* | 5/2023 | Gupta ............. H04L 63/0272 |
| | | 709/245 |

* cited by examiner

DYNAMIC CREATION OF OVERLAY NETWORK SLICES USING BORDER GATEWAY PROTOCOL FLOW SPECIFICATIONS

RELATED APPLICATION

This application is a continuation of U.S. patent application Ser. No. 18/149,338, filed Jan. 3, 2023 (now U.S. Pat. No. 11,949,560), which is incorporated herein by reference in its entirety.

BACKGROUND

The border gateway protocol (BGP) is a standardized exterior gateway protocol designed to exchange routing and reachability information among autonomous systems (AS) on the Internet. The BGP is a path-vector routing protocol that determines routing decisions based on paths, network policies, rule sets, and/or the like.

SUMMARY

Some implementations described herein relate to a method. The method may include receiving a BGP flow specification route associated with creation of an overlay network slice in a network, and creating a new routing instance based on the BGP flow specification route. The method may include associating interfaces defined by the BGP flow specification route with virtual private network (VPN) members, and determining VPN parameters based on the BGP flow specification route. The method may include advertising the VPN parameters within the network to cause the network to generate the overlay network slice.

Some implementations described herein relate to a network device. The network device may include one or more memories and one or more processors. The one or more processors may be configured to receive a BGP flow specification route associated with creation of an overlay network slice in a network, and create a new routing instance based on the BGP flow specification route. The one or more processors may be configured to associate interfaces defined by the BGP flow specification route with VPN members, and determine VPN parameters based on the BGP flow specification route. The one or more processors may be configured to advertise the VPN parameters within the network to cause the network to generate the overlay network slice, and utilize the overlay network slice generated based on advertising the VPN parameters.

Some implementations described herein relate to a non-transitory computer-readable medium that stores a set of instructions for a network device. The set of instructions, when executed by one or more processors of the network device, may cause the network device to receive a BGP flow specification route associated with creation of an overlay network slice in a network, and create a new routing instance based on the BGP flow specification route. The set of instructions, when executed by one or more processors of the network device, may cause the network device to associate interfaces defined by the BGP flow specification route with Layer 3 virtual private network (L3VPN) members, and determine L3VPN parameters based on the BGP flow specification route. The set of instructions, when executed by one or more processors of the network device, may cause the network device to advertise the L3VPN parameters within the network to cause the network to generate the overlay network slice.

DETAILED DESCRIPTION

The following detailed description of example implementations refers to the accompanying drawings. The same reference numbers in different drawings may identify the same or similar elements.

Fifth-generation (5G) network slicing initiatives call for potential creation and/or management of tens of thousands of overlay network slices defined as Layer 3 virtual private networks (L3VPNs). Future 5G service-oriented networks may include hundreds of thousands of provider edge network devices onto which the L3VPNs would be provisioned. Current 5G network architectures may be software driven via fully centralized orchestration and controller systems. However, such centralized systems present a scaling hurdle associated with state and session management for hundreds of thousands of network devices offering tens of thousands of L3VPNs. Thus, current techniques for providing and managing overlay network slices consume computing resources (e.g., processing resources, memory resources, communication resources, and/or the like), networking resources, and/or the like, associated with failing to generate overlay network slices in a timely manner, providing a poor experience for customers of 5G networks, generating inferior overlay network slices, causing lost traffic due to inferior overlay network slices, and/or the like.

Some implementations described herein relate to a network device that provides dynamic creation of overlay network slices using BGP flow specifications. For example, a network device may receive a BGP flow specification route associated with creation of an overlay network slice in a network, and may create a new routing instance based on the BGP flow specification route. The network device may associate interfaces defined by the BGP flow specification route with VPN members, and may determine VPN parameters based on the BGP flow specification route. The network device may advertise the VPN parameters within the network to cause the network to generate the overlay network slice.

In this way, the network device provides dynamic creation of overlay network slices using BGP flow specifications. For example, a network device may automatically create an overlay network slice (e.g., an L3VPN) and associated attachment circuits based on receipt of a BGP flow specification route. The network device may receive a new BGP flow specification route with a redirect action specifying a routing instance not yet present on the network device. Based on the new BGP flow specification route, the network device may automatically create the routing instance along with necessary L3VPN-specific attributes. The network device may associate interfaces defined by the BGP flow specification route to members of the L3VPN, and may create L3VPN parameters. The network device may advertise the L3VPN parameters within a network to create the overlay network slice in the network. Thus, the network device conserves computing resources, networking resources, and/or that like that would otherwise have been consumed by failing to generate overlay network slices in a timely manner, providing a poor experience for customers of 5G networks, generating inferior overlay network slices, causing lost traffic due to inferior overlay network slices, and/or the like.

FIGS. 1A-1D are diagrams of an example 100 associated with providing dynamic creation of overlay network slices using BGP flow specifications. As shown in FIGS. 1A-1D, example 100 includes endpoint devices and a network of network devices. Some of the network devices may include router reflector (RR) network devices, provider edge (PE1 and PEx) network devices, and/or the like. Further details of the endpoint devices, the network, and the network devices are provided elsewhere herein. Although implementations are described in connection with a single network device, the implementations may be applied to all of the network devices of the network.

Figure 1A:
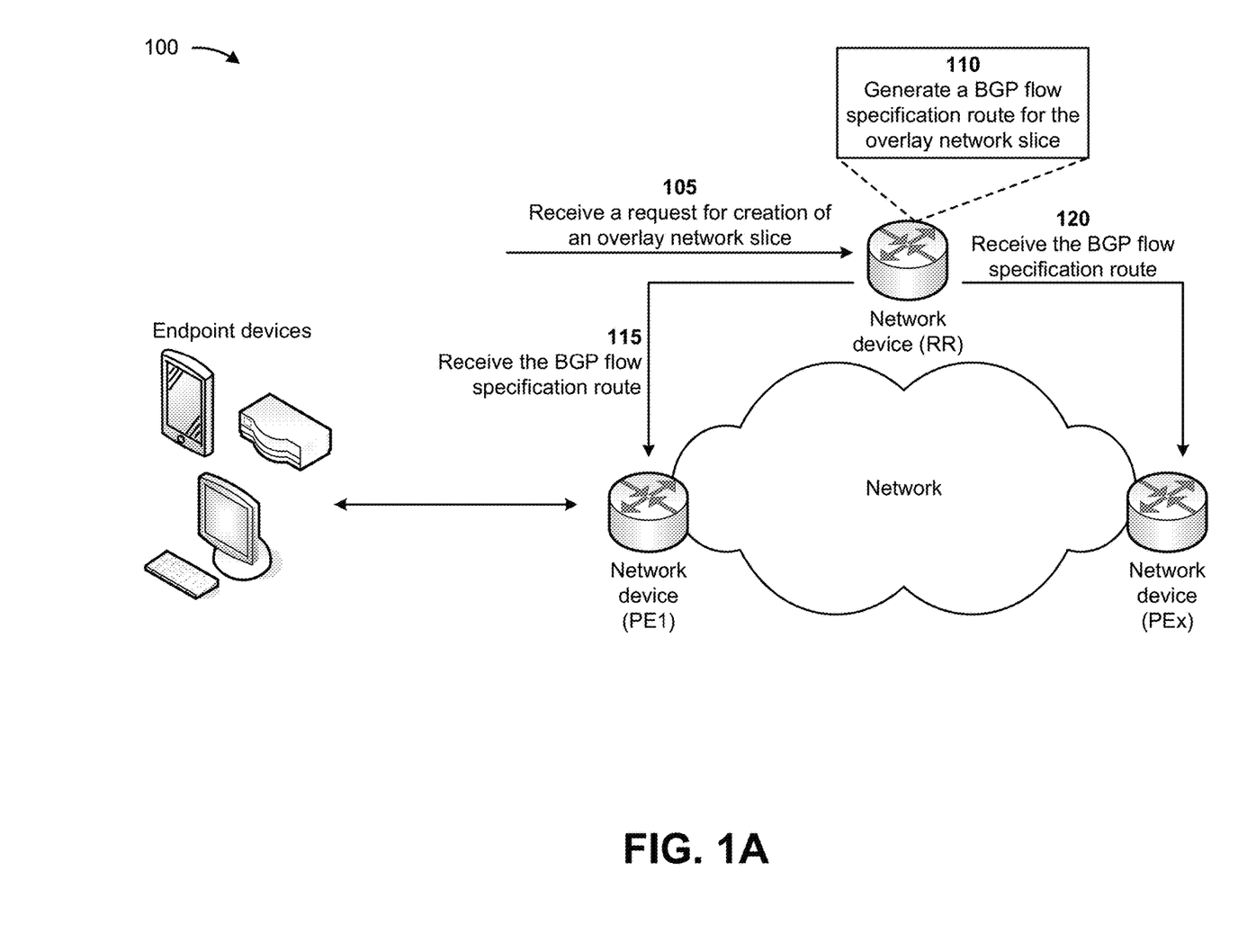
FIGS. 1A-1D are diagrams of an example associated with providing dynamic creation of overlay network slices using BGP flow specifications.

As shown in FIG. 1A, and by reference number 105, the RR network device may receive a request for creation of an overlay network slice. For example, an orchestration system associated with the network may generate the request for creation of the overlay network slice in the network. In some implementations, the network may be a 5G network and the overlay network slice may be a 5G overlay network slice. In some implementations, the overlay network slice may be defined as a VPN (e.g., an L3VPN) of the network. The orchestration system may provide the request for creation of the overlay network slice to the RR network device, and the RR network device may receive the request for creation of the overlay network slice from the orchestration system.

As further shown in FIG. 1A, and by reference number 110, the RR network device may generate a BGP flow specification route for the overlay network slice. For example, the RR network device may generate the BGP flow specification route for the overlay network slice based on receiving the request for creation of the overlay network slice. In some implementations, the BGP flow specification route may include information to be utilized to generate the overlay network slice. For example, the BGP flow specification route may include network layer reachability information (NLRI) that describes several types of Layer 3 and Layer 4 details that may be utilized to define a flow specification and actions to be assigned to the flow specification based on requirements of the overlay network slice. In some implementations, the BGP flow specification route may include data identifying rate limiting flows in the overlay network slice, drop flows in the overlay network slice, redirect flows in the overlay network slice, and/or the like.

As further shown in FIG. 1A, and by reference number 115, the PE1 network device may receive the BGP flow specification route. For example, the RR network device may provide the BGP flow specification route to the PE1 network device, and the PE1 network device may receive the BGP flow specification route from the RR network device. In some implementations, the network may include a plurality of RR network devices that generate and provide the BGP flow specification route to a plurality of PE network devices. The network may include tens of thousands of overlay network slices defined as L3VPNs, and hundreds of thousands of PE network devices onto which the L3VPNs are provisioned. Thus, the plurality of RR network devices may be unable to provide BGP flow specification routes to all of the PE network devices. However, the PE network devices may automatically create the L3VPNs for the overlay network slices by sharing the BGP flow specification routes with other PE network devices, by advertising the L3VPNs to other PE network devices, and/or the like.

As further shown in FIG. 1A, and by reference number 120, the PEx network device may receive the BGP flow specification route. For example, the RR network device may provide the BGP flow specification route to one or more other PE network devices, such as the PEx network device. The PEx network device may receive the BGP flow specification route from the RR network device.

Figure 1B:
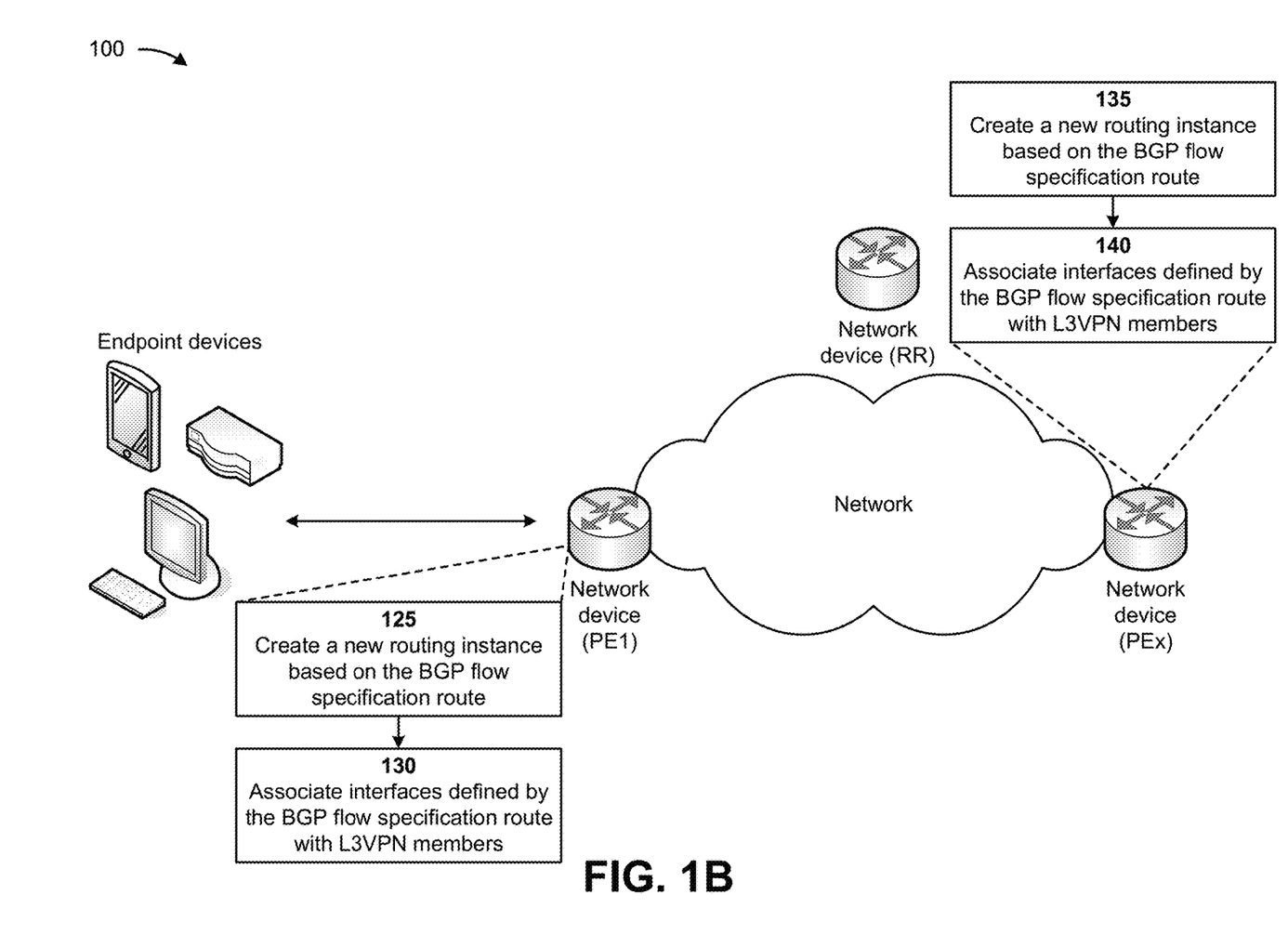

As shown in FIG. 1B, and by reference number 125, the PE1 network device may create a new routing instance based on the BGP flow specification route. For example, the BGP flow specification route may include a redirect action specifying a new routing instance not yet present on the PE1 network device. When the BGP flow specification route with the redirect action specifying the new routing instance is received, the PE1 network device may automatically create the routing instance and L3VPN-specific attributes for the routing instance.

As further shown in FIG. 1B, and by reference number 130, the PE1 network device may associate interfaces defined by the BGP flow specification route with L3VPN members. For example, the BGP flow specification route may define interfaces associated with members (e.g., network devices) of the L3VPN to be created for the overlay network slice. In some implementations, the PE1 network device may associate the interfaces defined by the BGP flow specification route with the L3VPN members.

As further shown in FIG. 1B, and by reference number 135, the PEx network device may create a new routing instance based on the BGP flow specification route. For example, the BGP flow specification route may include a redirect action specifying a new routing instance not yet present on the PEx network device. When the BGP flow specification route with the redirect action specifying the new routing instance is received, the PEx network device may automatically create the routing instance and L3VPN-specific attributes for the routing instance.

As further shown in FIG. 1B, and by reference number 140, the PEx network device may associate interfaces defined by the BGP flow specification route with L3VPN members. For example, the BGP flow specification route may define interfaces associated with members (e.g., network devices) of the L3VPN to be created for the overlay network slice. In some implementations, the PEx network device may associate the interfaces defined by the BGP flow specification route with the L3VPN members.

Figure 1C:
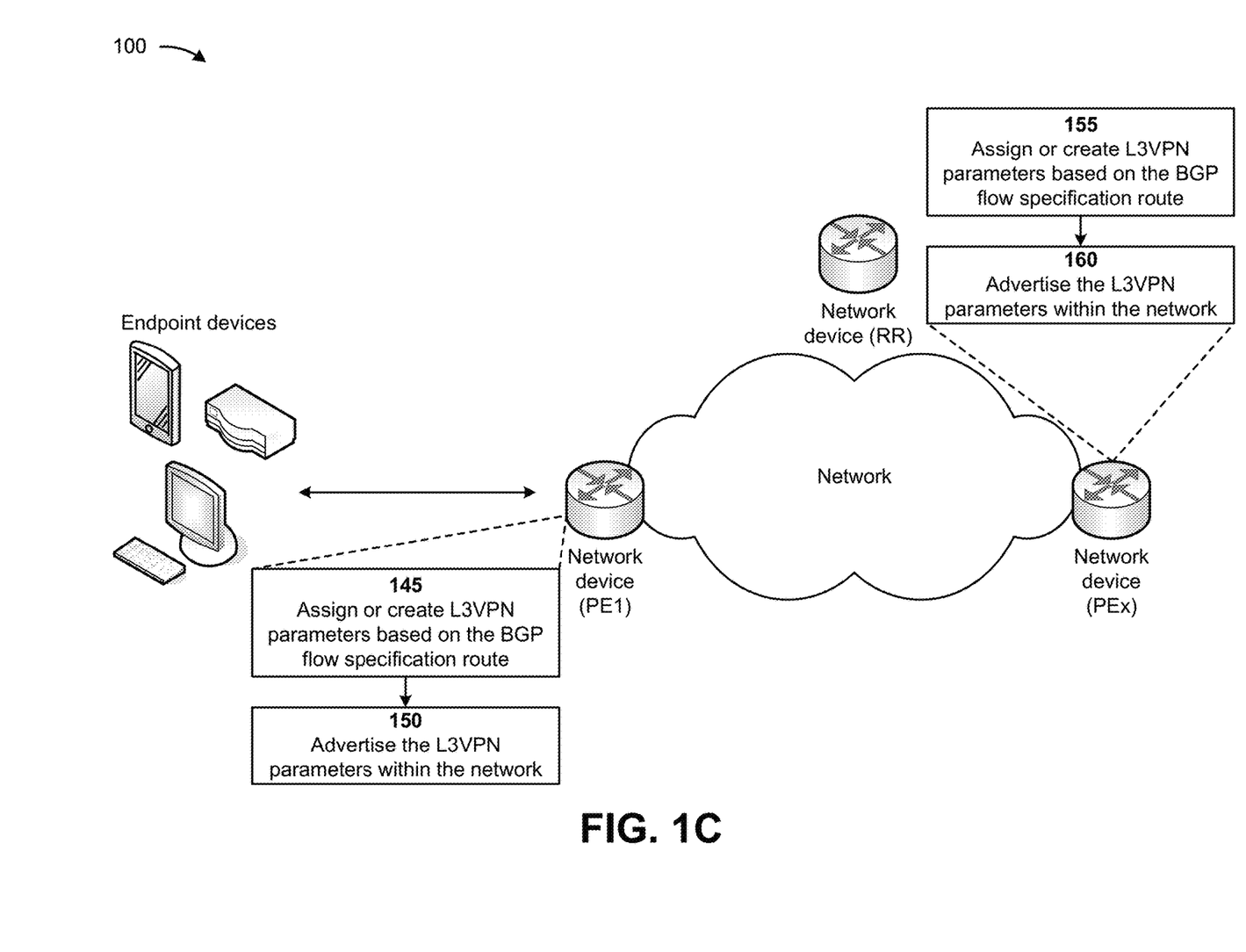

As shown in FIG. 1C, and by reference number 145, the PE1 network device may assign or create L3VPN parameters based on the BGP flow specification route. For example, the PE1 network device may determine VPN parameters (e.g., L3VPN parameters) based on the BGP flow specification route. In some implementations, when determining the VPN parameters based on the BGP flow specification route, the PE1 network device may assign the VPN parameters based on the BGP flow specification route (e.g., based on VPN parameters identified in the BGP flow specification route), may create the VPN parameters based on the BGP flow specification route (e.g., when VPN parameters are not identified in the BGP flow specification route), and/or the like. In some implementations, the VPN parameters may include a parameter defining one or more interfaces for the L3VPN, a parameter defining one or more route targets for the L3VPN, a parameter defining one or more route distinguishers for the L3VPN, a parameter defining traffic conditioning for the L3VPN, and/or the like.

As further shown in FIG. 1C, and by reference number 150, the PE1 network device may advertise the L3VPN parameters within the network. For example, the PE1 network device may advertise the VPN parameters (e.g., L3VPN parameters) to one or more other PE network devices of the network. The one or more other network devices may receive the VPN parameters, and may generate the L3VPN for the overlay network slice based on the VPN parameters. The PE1 network device may coordinate with the other one or more other network devices to generate the L3VPN for the overlay network slice.

As further shown in FIG. 1C, and by reference number 155, the PEx network device may assign or create L3VPN parameters based on the BGP flow specification route. For example, the PEx network device may determine VPN parameters (e.g., L3VPN parameters) based on the BGP flow specification route. In some implementations, when determining the VPN parameters based on the BGP flow specification route, the PEx network device may assign the VPN parameters based on the BGP flow specification route (e.g., based on VPN parameters identified in the BGP flow specification route), may create the VPN parameters based on the BGP flow specification route (e.g., when VPN parameters are not identified in the BGP flow specification route), and/or the like. In some implementations, the VPN parameters may include the features described above in connection with the PE1 network device.

As further shown in FIG. 1C, and by reference number 160, the PEx network device may advertise the L3VPN parameters within the network. For example, the PEx network device may advertise the VPN parameters (e.g., L3VPN parameters) to one or more other PE network devices of the network. The one or more other network devices may receive the VPN parameters, and may generate the L3VPN for the overlay network slice based on the VPN parameters. The PEx network device may coordinate with the other one or more other network devices to generate the L3VPN for the overlay network slice. In some implementations, the overlay network slice may be generated via one or more traffic engineered transport tunnels in the network. Alternatively, or additionally, the overlay network slice may be generated based on creation of a transport routing information base (RIB) for the overlay network slice.

Figure 1D:
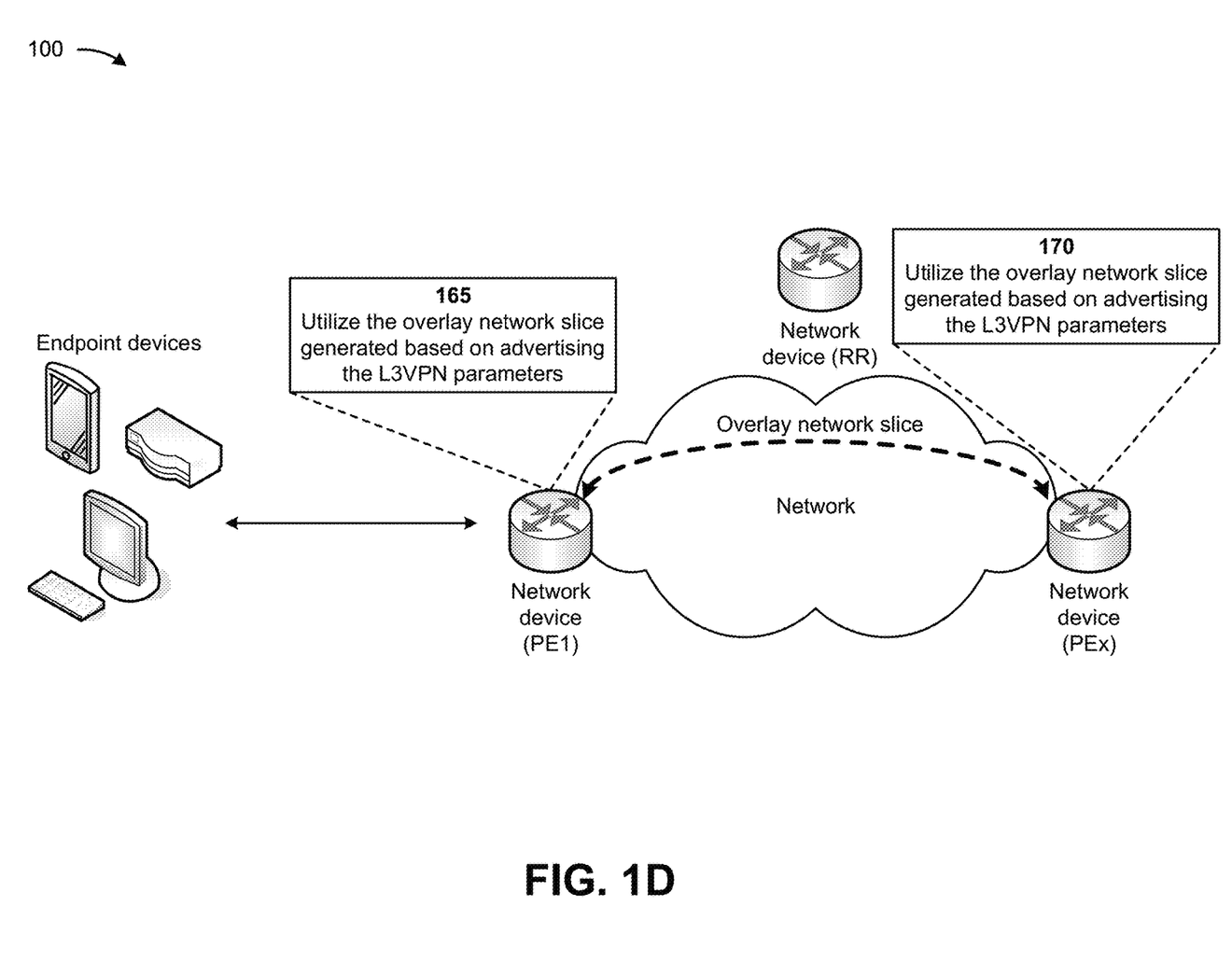

As shown in FIG. 1D, and by reference number 165, the PE1 network device may utilize the overlay network slice generated based on advertising the L3VPN parameters. For example, advertisement of the L3VPN parameters may cause the network to generate the overlay network slice defined as the L3VPN. Once the overlay network slice is generated, the PE1 network device may utilize the overlay network slice to transmit and/or receive traffic associated with a service provided by the overlay network slice. For example, the PE1 network device may utilize the overlay network slice to transmit traffic to one or more of the endpoint devices and/or to receive traffic from one or more of the endpoint devices.

As further shown in FIG. 1D, and by reference number 170, the PEx network device may utilize the overlay network slice generated based on advertising the L3VPN parameters. For example, once the overlay network slice is generated, the PEx network device may utilize the overlay network slice to transmit and/or receive traffic associated with the service provided by the overlay network slice. For example, the PEx network device may utilize the overlay network slice to transmit traffic to one or more of the endpoint devices and/or to receive traffic from one or more of the endpoint devices.

In this way, the network device provides dynamic creation of overlay network slices using BGP flow specifications. For example, a network device may automatically create an overlay network slice (e.g., an L3VPN) and associated attachment circuits based on receipt of a BGP flow specification route. The network device may receive a new BGP flow specification route with a redirect action specifying a routing instance not yet present on the network device. Based on the new BGP flow specification route, the network device may automatically create the routing instance along with necessary L3VPN-specific attributes. The network device may associate interfaces defined by the BGP flow specification route to members of the L3VPN, and may create L3VPN parameters. The network device may advertise the L3VPN parameters within a network to create the overlay network slice in the network. Thus, the network device conserves computing resources, networking resources, and/or that like that would otherwise have been consumed by failing to generate overlay network slices in a timely manner, providing a poor experience for customers of 5G networks, generating inferior overlay network slices, causing lost traffic due to inferior overlay network slices, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
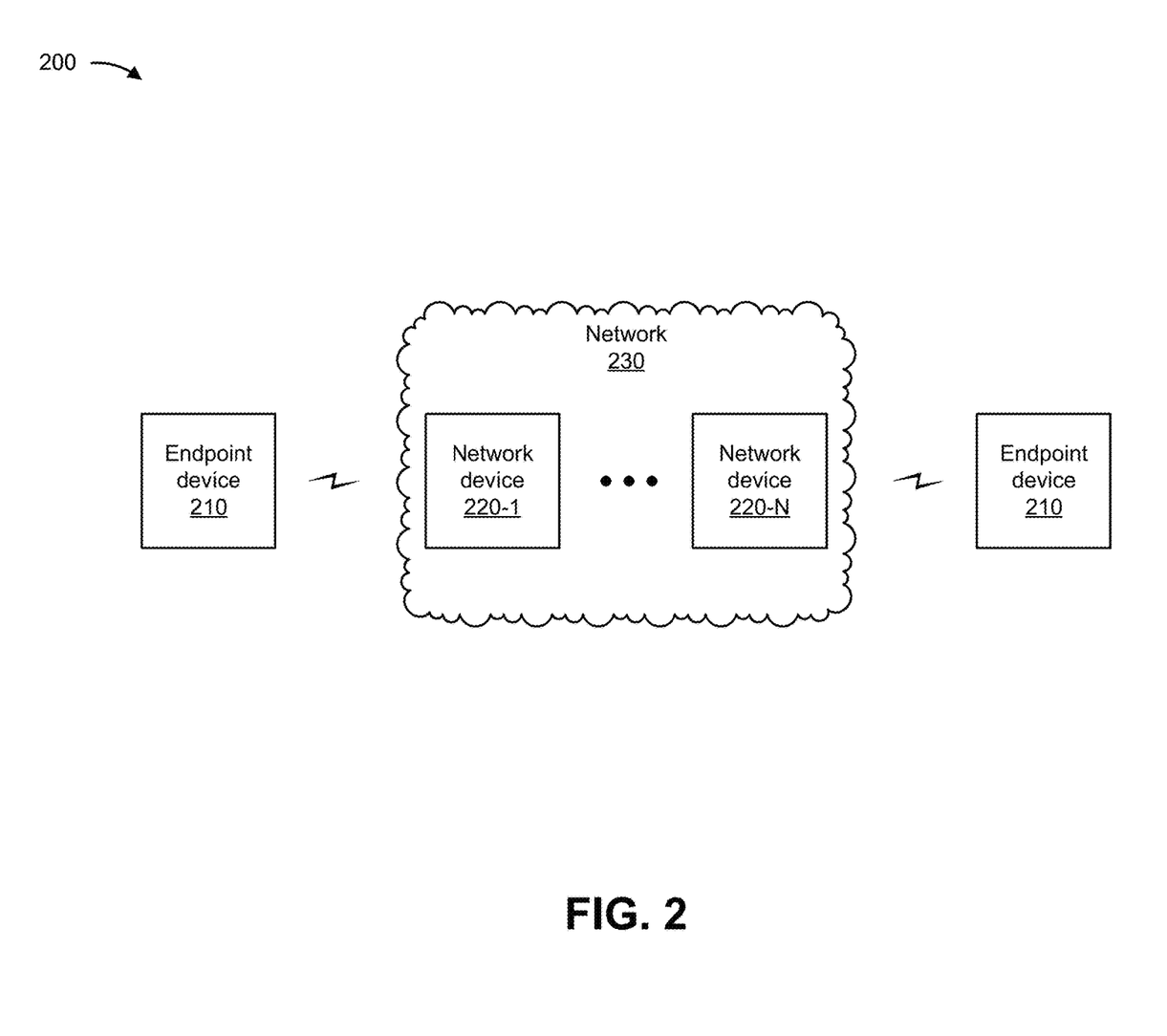
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of endpoint devices 210, a group of network devices 220 (shown as network device 220-1 through network device 220-N), and a network 230. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210, via the network 230 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, and/or the like), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
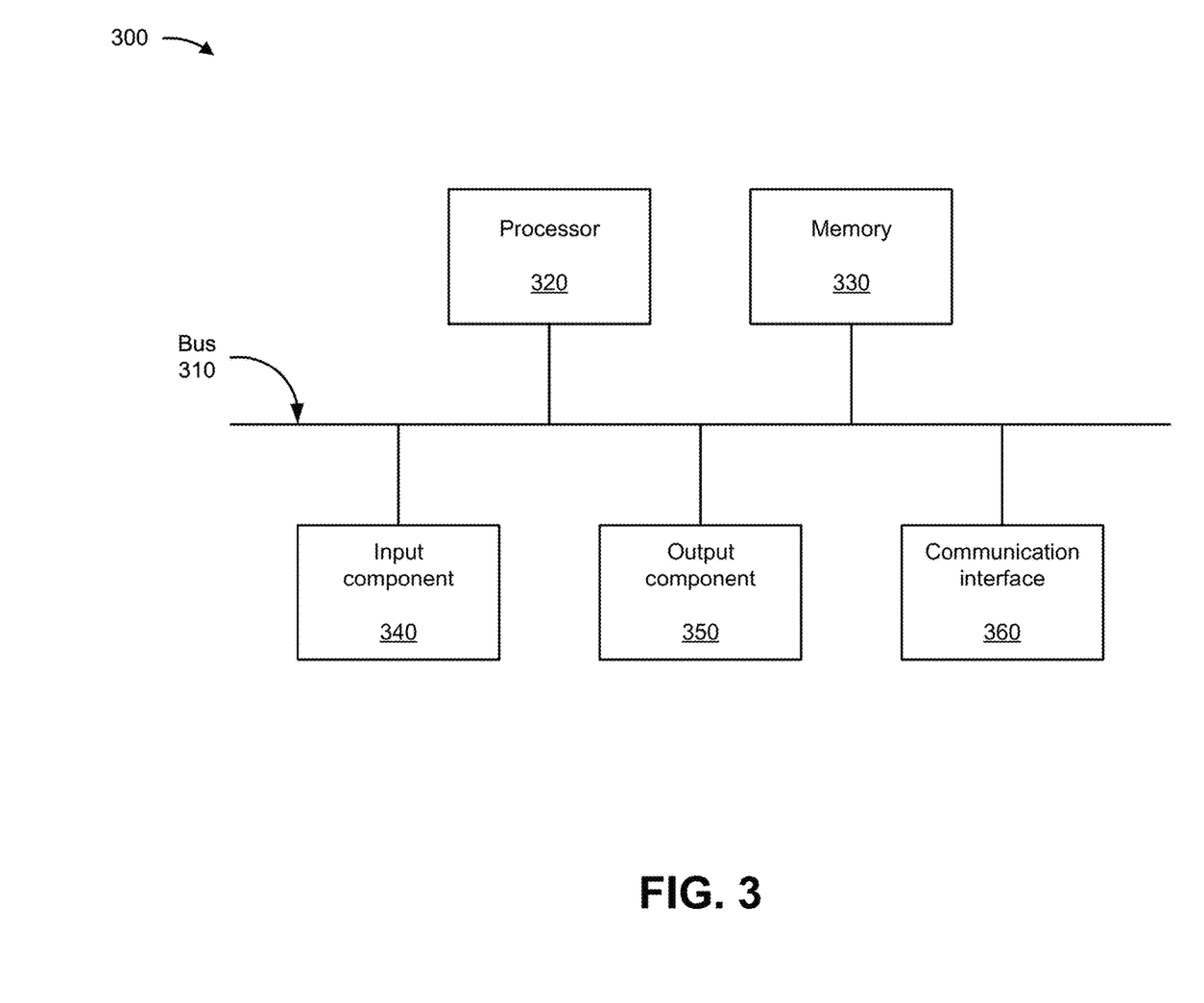
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210 and/or the network device 220. In some implementations, the endpoint device 210 and/or the network device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
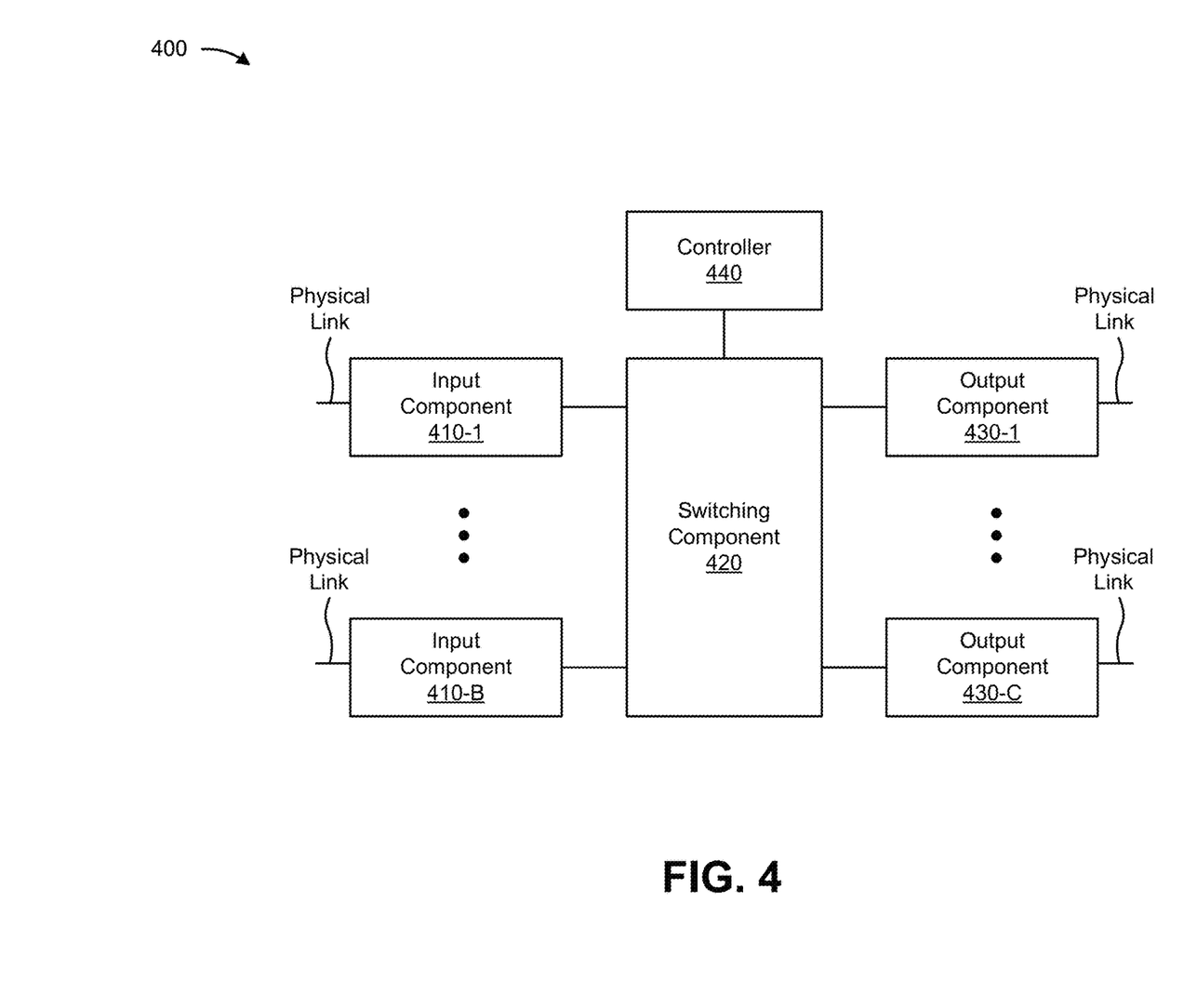

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
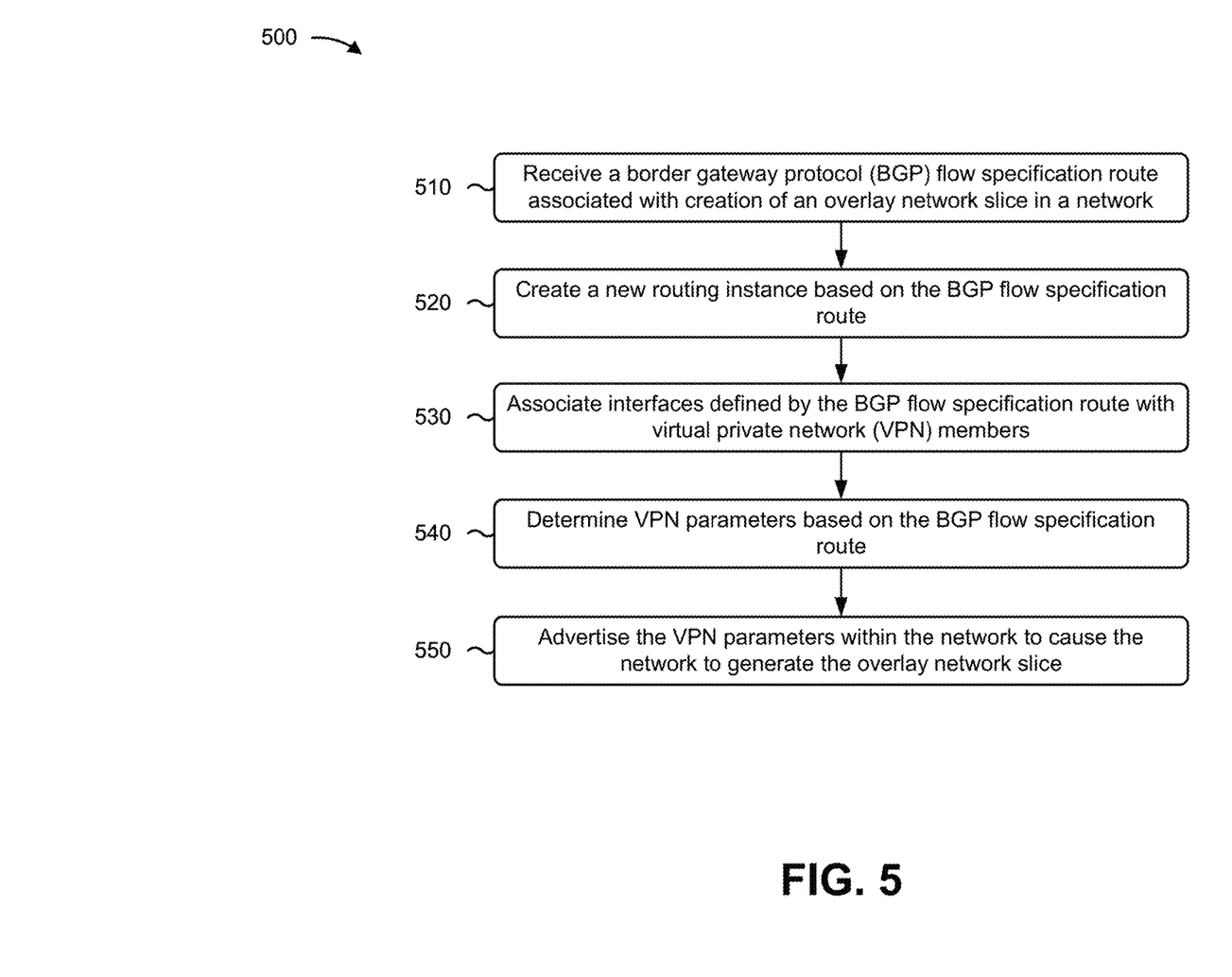
FIG. 5 is a flowchart of an example process for providing dynamic creation of overlay network slices using BGP flow specifications.

FIG. 5 is a flowchart of an example process 500 for providing dynamic creation of overlay network slices using BGP flow specifications. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a BGP flow specification route associated with creation of an overlay network slice in a network (block 510). For example, the network device may receive a BGP flow specification route associated with creation of an overlay network slice in a network, as described above. In some implementations, the network device is a provider edge network device. In some implementations, receiving the BGP flow specification route includes receiving the BGP flow specification route from a route reflector network device that generated the BGP flow specification route based on a request for creation of the overlay network slice. In some implementations, the BGP flow specification route includes network layer reachability information.

In some implementations, the BGP flow specification route includes data identifying one or more of rating limiting flows in the overlay network slice, dropping flows in the overlay network slice, or redirecting flows in the overlay network slice. In some implementations, the BGP flow specification route is provided to one or more other network devices of the network to aid in generating the overlay network slice. In some implementations, the overlay network slice is a fifth-generation network overlay network slice.

As further shown in FIG. 5, process 500 may include creating a new routing instance based on the BGP flow specification route (block 520). For example, the network device may create a new routing instance based on the BGP flow specification route, as described above.

As further shown in FIG. 5, process 500 may include associating interfaces defined by the BGP flow specification route with VPN members (block 530). For example, the network device may associate interfaces defined by the BGP flow specification route with VPN members, as described above.

As further shown in FIG. 5, process 500 may include determining VPN parameters based on the BGP flow specification route (block 540). For example, the network device may determine VPN parameters based on the BGP flow specification route, as described above. In some implementations, determining the VPN parameters based on the BGP flow specification route includes one of assigning the VPN parameters based on the BGP flow specification route, or creating the VPN parameters based on the BGP flow specification route. In some implementations, the VPN parameters are Layer 3 VPN parameters. In some implementations, the VPN parameters include one or more of a parameter defining one or more interfaces, a parameter defining one or more route targets, a parameter defining one or more route distinguishers, or a parameter defining traffic conditioning.

As further shown in FIG. 5, process 500 may include advertising the VPN parameters within the network to cause the network to generate the overlay network slice (block 550). For example, the network device may advertise the VPN parameters within the network to cause the network to generate the overlay network slice, as described above. In some implementations, the overlay network slice is generated via one or more traffic engineered transport tunnels in the network. In some implementations, the overlay network slice is generated based on creation of a transport routing information base for the overlay network slice.

In some implementations, process 500 includes utilizing the overlay network slice generated based on advertising the VPN parameters.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   creating, by a network device of a network, a routing instance based on a border gateway protocol (BGP) flow specification route,
      wherein the BGP flow specification route includes data identifying rate limiting flows in a Layer 3 virtual private network (L3VPN), redirect flows in the L3VPN, and drop flows in the L3VPN;
   assigning, by the network device, virtual private network (VPN) parameters based on the BGP flow specification route; and
   advertising, by the network device, the VPN parameters within the network,
      wherein advertisement of the VPN parameters within the network permits the L3VPN to be generated in the network.

2. The method of claim 1, wherein the BGP flow specification route is associated with creation of an overlay network slice in the network.

3. The method of claim 2, further comprising:
receiving the BGP flow specification route from a route reflector network device that generated the BGP flow specification route based on a request for creation of the overlay network slice.

4. The method of claim 2, wherein the overlay network slice is generated via one or more traffic engineered transport tunnels in the network.

5. The method of claim 2, wherein the overlay network slice is generated based on creation of a transport routing information base for the overlay network slice.

6. The method of claim 1, wherein the BGP flow specification route includes network layer reachability information.

7. The method of claim 1, wherein the VPN parameters include one or more of:
a parameter defining one or more interfaces,
a parameter defining one or more route targets,
a parameter defining one or more route distinguishers, or
a parameter defining traffic conditioning.

8. A network device, comprising:
one or more memories; and
one or more processors to:
create a routing instance based on a border gateway protocol (BGP) flow specification route,
wherein the BGP flow specification route includes data identifying rate limiting flows in a Layer 3 virtual private network (L3VPN), redirect flows in the L3VPN, and drop flows in the L3VPN;
assign virtual private network (VPN) parameters based on the BGP flow specification route; and
advertise the VPN parameters within a network associated with the network device,
wherein advertisement of the VPN parameters within the network permits the L3VPN to be generated in the network.

9. The network device of claim 8, wherein the BGP flow specification route is associated with a creation of an overlay network slice in the network.

10. The network device of claim 9, wherein the one or more processors are further to:
receive the BGP flow specification route from a route reflector network device that generated the BGP flow specification route based on a request for creation of the overlay network slice.

11. The network device of claim 9, wherein the overlay network slice is generated via one or more traffic engineered transport tunnels in the network.

12. The network device of claim 9, wherein the overlay network slice is generated based on creation of a transport routing information base for the overlay network slice.

13. The network device of claim 8, wherein the VPN parameters include one or more of:
a parameter defining one or more interfaces,
a parameter defining one or more route targets,
a parameter defining one or more route distinguishers, or
a parameter defining traffic conditioning.

14. The network device of claim 8, wherein the BGP flow specification route includes network layer reachability information.

15. A non-transitory computer-readable medium storing a set of instructions, the set of instructions comprising:
one or more instructions that, when executed by one or more processors of a network device, cause the network device to:
create a routing instance based on a border gateway protocol (BGP) flow specification route,
wherein the BGP flow specification route includes data identifying rate limiting flows in a Layer 3 virtual private network (L3VPN), redirect flows in the L3VPN, and drop flows in the L3VPN;
assign virtual private network (VPN) parameters based on the BGP flow specification route; and
advertise the VPN parameters within a network associated with the network device,
wherein advertisement of the VPN parameters within the network permits the L3VPN to be generated in the network.

16. The non-transitory computer-readable medium of claim 15, wherein the BGP flow specification route is associated with a creation of an overlay network slice in the network.

17. The non-transitory computer-readable medium of claim 16, wherein the one or more instructions further cause the network device to:
receive the BGP flow specification route from a route reflector network device that generated the BGP flow specification route based on a request for creation of the overlay network slice.

18. The non-transitory computer-readable medium of claim 16, wherein the overlay network slice is generated via one or more traffic engineered transport tunnels in the network.

19. The non-transitory computer-readable medium of claim 16, wherein the overlay network slice is generated based on creation of a transport routing information base for the overlay network slice.

20. The non-transitory computer-readable medium of claim 15, wherein the VPN parameters include one or more of:
a parameter defining one or more interfaces,
a parameter defining one or more route targets,
a parameter defining one or more route distinguishers, or
a parameter defining traffic conditioning.

* * * * *